(12) United States Patent
Langry et al.

(10) Patent No.: US 9,017,900 B2
(45) Date of Patent: Apr. 28, 2015

(54) FUEL CELL COMPONENTS AND SYSTEMS HAVING CARBON-CONTAINING ELECTRICALLY-CONDUCTIVE HOLLOW FIBERS

(71) Applicant: Lawrence Livermore National Security, LLC, Livermore, CA (US)

(72) Inventors: Kevin C. Langry, Tracy, CA (US); Joseph C. Farmer, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/293,993

(22) Filed: Jun. 2, 2014

(65) Prior Publication Data

US 2014/0335443 A1 Nov. 13, 2014

Related U.S. Application Data

(62) Division of application No. 12/706,626, filed on Feb. 16, 2010, now Pat. No. 8,771,899.

(51) Int. Cl.
*H01M 8/10* (2006.01)
*H01M 8/02* (2006.01)
*H01M 8/24* (2006.01)
*H01M 8/00* (2006.01)

(52) U.S. Cl.
CPC .......... *H01M 8/0252* (2013.01); *H01M 8/1065* (2013.01); *H01M 8/241* (2013.01); *H01M 2008/1095* (2013.01); *Y02E 60/521* (2013.01); *H01M 8/004* (2013.01); *H01M 8/0234* (2013.01); *Y10S 977/948* (2013.01)

(58) Field of Classification Search
CPC H01M 8/0252; H01M 8/1065; H01M 8/0234
USPC .......................................... 429/497, 492, 494
See application file for complete search history.

(56) References Cited

U.S. PATENT DOCUMENTS

| | | | |
|---|---|---|---|
| 6,998,624 B2 | 2/2006 | Katagiri | |
| 7,048,904 B2 | 5/2006 | Yanagisawa et al. | |
| 7,150,932 B1 | 12/2006 | Hofler et al. | |
| 7,229,712 B2 | 6/2007 | Eshraghi et al. | |
| 8,771,899 B2 | 7/2014 | Langry et al. | |

(Continued)

FOREIGN PATENT DOCUMENTS

EP          1460703          9/2004

OTHER PUBLICATIONS

Strelko, V., "Novel high power density carbon fibre monoblock PEM fuel cell," URN—05-1394, Guildford, UK: MAST Carbon Ltd., 2005, 2 pages.

(Continued)

*Primary Examiner* — Helen O Conley
(74) *Attorney, Agent, or Firm* — Zilka Kotab

(57) ABSTRACT

A method, according to one embodiment, includes acquiring a structure having an ionically-conductive, electrically-resistive electrolyte/separator layer covering an inner or outer surface of a carbon-containing electrically-conductive hollow fiber and a catalyst along one side thereof, adding an anode that extends along at least part of a length of the structure, and adding a cathode that extends along at least part of the length of the structure, the cathode being on an opposite side of the hollow fiber as the anode.

20 Claims, 5 Drawing Sheets

(56) References Cited

U.S. PATENT DOCUMENTS

2003/0224132 A1 12/2003 Han
2004/0185320 A1 9/2004 Inagaki et al.
2007/0166603 A1 7/2007 Nakanishi et al.
2011/0200912 A1 8/2011 Langry et al.

OTHER PUBLICATIONS

Ishida et al., "Micro-tubular direct methanol fuel cells for portable applications," Electrochemistry, vol. 70, No. 12, 2002, pp. 975-979.

Restriction/Election Requirement from U.S. Appl. No. 12/706,626 dated Aug. 31, 2012.

Non-Final Office Action from U.S. Appl. No. 12/706,626 dated Jan. 17, 2013.

Final Office Action from U.S. Appl. No. 12/706,626 dated Jun. 27, 2013.

Notice of Allowance and Fee(s) Due from U.S. Appl. No. 12/706,626 dated Mar. 3, 2014.

FUEL CELL COMPONENTS AND SYSTEMS HAVING CARBON-CONTAINING ELECTRICALLY-CONDUCTIVE HOLLOW FIBERS

RELATED APPLICATIONS

This application is a divisional of U.S. application Ser. No. 12/706,626 filed on Feb. 16, 2010, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to fuel cells, and more particularly to hollow fibers for use in electron and proton separation in fuel cells.

BACKGROUND

A simplified pictorial version of a unit fuel cell is shown in FIG. 1. The fuel cell 100 is essentially composed of two chambers: the anode compartment 102 (including the anode 110) where fuel is oxidized and the cathode compartment 104 (including the cathode 112) where the reduction occurs. The energy generated from the reaction can be utilized if the flow of electrons occurs through the external circuit 106. Passage of electrons from anode 110 to cathode 112 through the membrane 108, made of a material such as polyelectrolyte, reduces the efficiency of the reaction and the performance of the fuel cell 100 is diminished. However, while the membrane 108 must minimize transport of electrons, migration of protons across the membrane 108 from anode 110 to cathode 112 is used to maintain a balanced electric charge across the membrane 108 and in the two cells. It is desirable to have a high proton conductivity and high electrical resistance in the membrane 108, which are relatively uncommon properties of materials. However, these properties are possessed by the Nafion-based family of polysulfonated fluoropolymers.

Nafion polymers can be cast from solution as thin films and/or pressed and extruded into form from powder to make thin polyelectrolyte membranes (PEMs) for fuel cells. However, these thin membranes are delicate and a high water content must be maintained to function property, thereby limiting the operational temperature of the fuel cell to less than 100° C. This low maximum operating temperature limits the selection of catalysts available for promoting the redox reactions to the most active in this temperature range, which are typically the platinum-based catalysts. The low operating temperature also requires that fuels must be very low in carbon monoxide (CO), because at these tow temperatures CO binds tenaciously to platinum and inhibits the oxidation reaction at the anode. Therefore, the fuel typically is purified hydrogen rather than hydrogen derived from reforming alcohols or alkanes to keep the CO content low. Note that platinum-ruthenium catalysts are less prone to CO poisoning than pure platinum catalysts. Similar benefits may exist with other catalyst systems.

FIG. 2 shows a practical rendition of a fuel cell 200 with the appropriate placement of the electrode structures pressed into contact with the PEM 202 and the orthogonal flow channels carrying fuel to the anode 204 and oxygen to the cathode 206. The byproduct of the cathodic reaction is water and this is removed along the oxygen flow path 208. Generally, an assembly of single unit fuel cells is included in a fuel cell stack. Considerable supporting structure is required to configure the membranes and hold them in place. The weight of these supporting structures is generally about 75% of the total weight of a standard fuel cell.

Accordingly, a better membrane arrangement which addresses the problems associated with typical fuel cell stacks would be beneficial to advancing the abilities of fuel cells and the use of fuel cells in energy generation.

SUMMARY

A method, according to one embodiment, includes acquiring a structure having an ionically-conductive, electrically-resistive electrolyte/separator layer covering an inner or outer surface of a carbon-containing electrically-conductive hollow fiber and a catalyst along one side thereof, adding an anode that extends along at least part of a length of the structure, and adding a cathode that extends along at least part of the length of the structure, the cathode being on an opposite side of the hollow fiber as the anode.

In another embodiment, a method for forming a component of a fuel cell system includes creating a structure, having an ionically-conductive, electrically-resistive electrolyte/separator layer covering an inner or outer surface of a carbon-containing electrically-conductive hollow fiber and a catalyst along one side of the hollow fiber.

Other aspects and advantages of the present invention will become apparent from the following detailed description, which, when taken in conjunction with the drawings, illustrate by way of example the principles of the invention.

DETAILED DESCRIPTION

Figure 1:
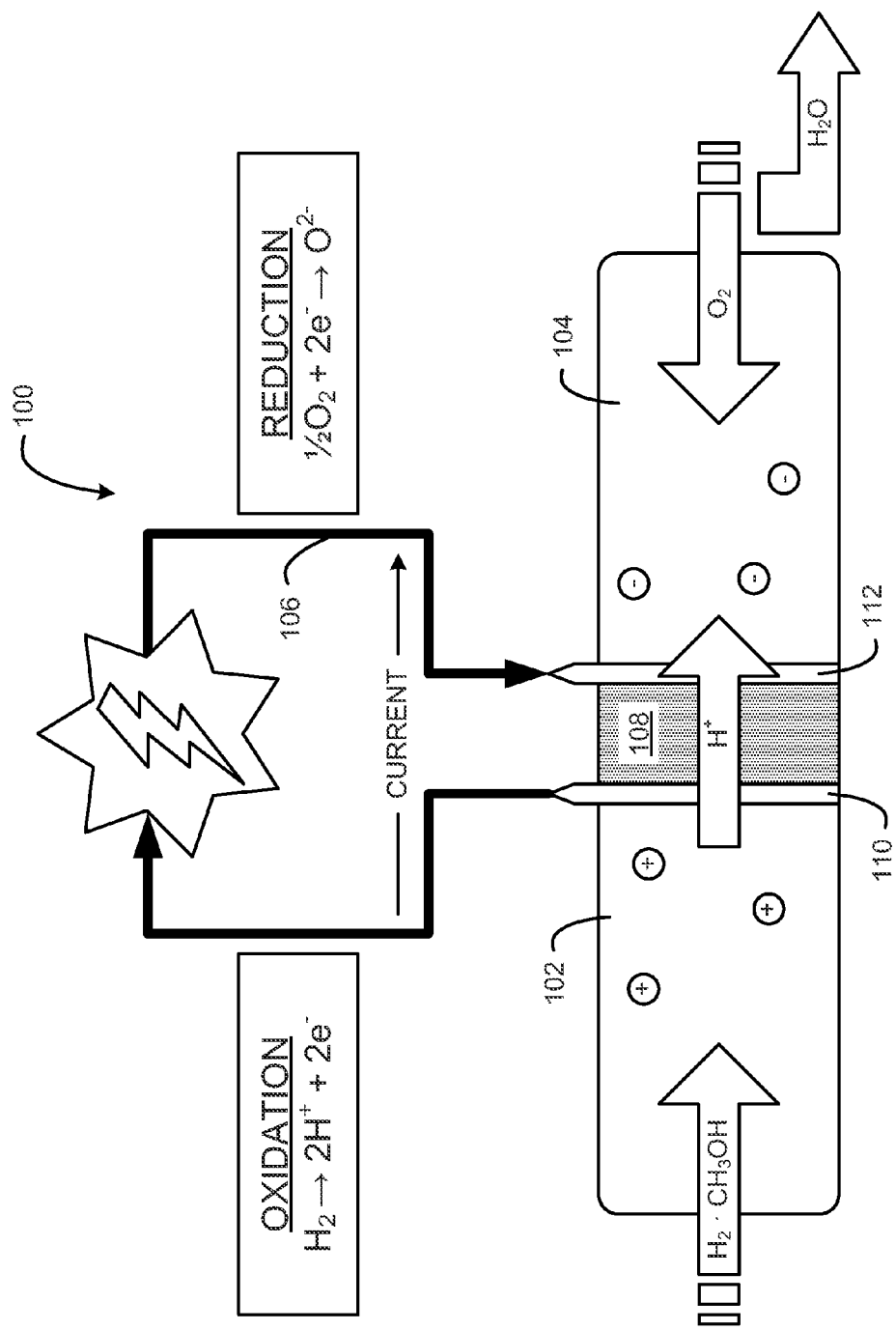
FIG. 1 shows a diagram of the basic components of a prior art fuel cell.
Figure 2:
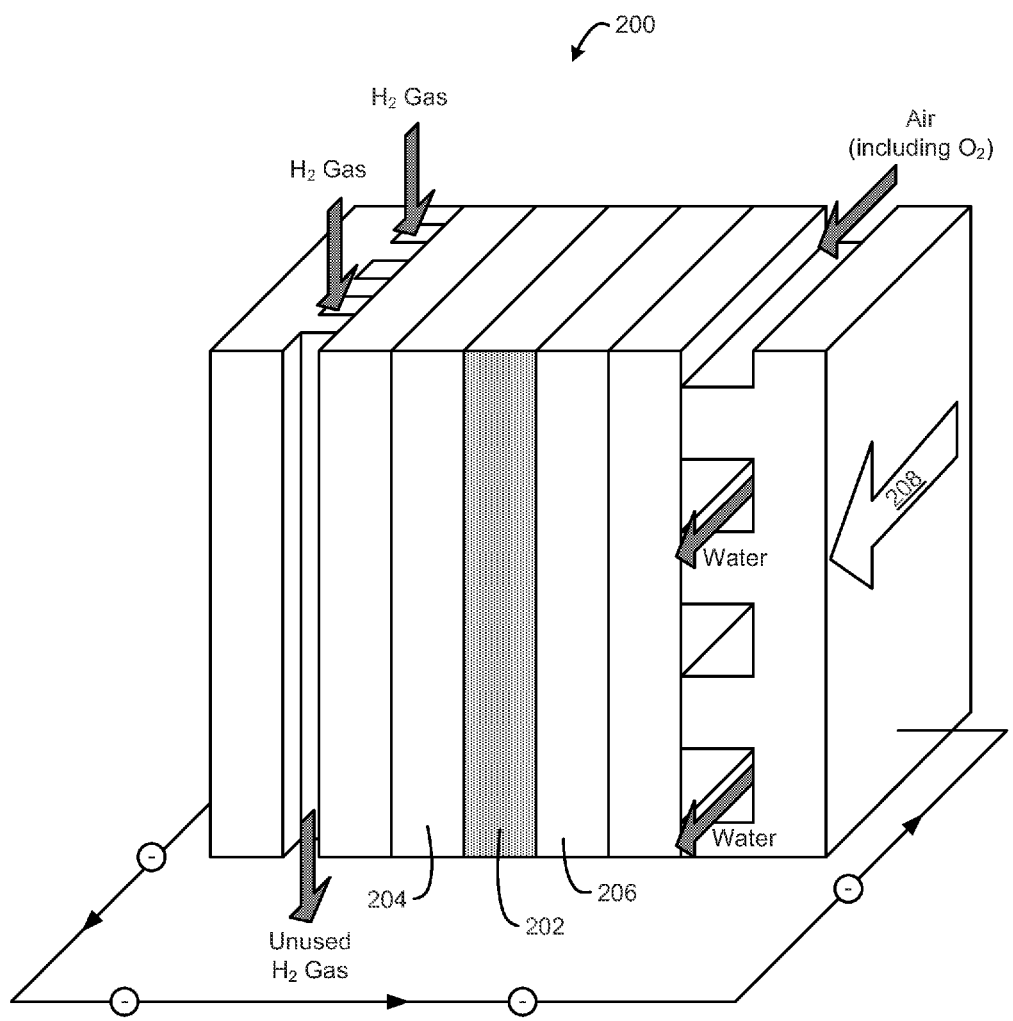
FIG. 2 shows a diagram of the components of a single unit fuel cell that may be incorporated into a stack of units according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a system includes an ionically-conductive, electrically-resistive electrolyte/separator layer covering an inner or outer surface of a carbon-containing electrically-conductive hollow fiber and a catalyst coupled to the hollow fiber; an anode extending along at least part of a length of the structure; and a cathode extending along at least part of the length of the structure, the cathode being on an opposite side of the hollow fiber as the anode.

In another general embodiment, a system includes an ionically-conductive, electrically-resistive electrolyte/separator layer covering an inner or outer surface of a carbonized hollow fiber, a first catalyst coupled to the hollow fiber, and a second catalyst coupled to the hollow fiber on an opposite side of the hollow fiber as the first catalyst, wherein a first surface of the hollow fiber is sulfonated, wherein a second surface of the hollow fiber is fluorinated; an anode extending along at least part of a length of the structure; a cathode extending along at least part of the length of the structure, the cathode being on an opposite side of the hollow fiber as the anode; and a support structure coupled to each end of the structure.

In another general embodiment, a method for forming a component of a fuel cell system includes creating an ionically-conductive, electrically-resistive electrolyte/separator layer covering an inner or outer surface of a carbon-containing electrically-conductive hollow fiber and a catalyst along one side of the hollow fiber.

In another general embodiment, a method for forming a component of a fuel cell system includes acquiring an ionically-conductive, electrically-resistive electrolyte/separator layer covering an inner or outer surface of a carbon-containing electrically-conductive hollow fiber and a catalyst along one side thereof; adding an anode that extends along at least part of a length of the structure; adding a cathode that extends along at least part of the length of the structure, the cathode being on an opposite side of the hollow fiber as the anode.

According to one general embodiment, a carbon-containing hollow fiber may act as an electrically conductive substrate for building a fuel cell structure. This fiber, according to preferred approaches, is both electrically-conductive and sufficiently porous for the passage of the gaseous hydrogen, oxygen, and water therethrough. An appropriate electro-catalyst for oxygen reduction or hydrogen oxidation may then be deposited on either the outer surface of the carbon hollow fiber, or on the inner surface of the carbon hollow-fiber. An electrically-resistive and ion-conductive electrolyte-separator layer may then be coated on either the inner surface of the carbon hollow fiber, or on the outer surface of the carbon hollow-fiber, whichever surface is opposite of where the electro-catalyst is deposited. The counter electrode, with an appropriate electro-catalyst, may then be deposited on top of the electrically-resistive, ion-conductive electrolyte-separator layer.

In this embodiment, if hydrogen flows on the inside of the fiber, oxygen may be supplied to the outside of the fiber. Conversely, if oxygen flows on the inside of the fiber, hydrogen may be supplied to the outside of the fiber. The materials, fluids and constituent components presented above are for a proton exchange membrane fuel cell; however, the design of this system is not so limited. By changing materials and/or fluids, the same geometrical design may also be used for other types of fuel cells.

Figure 4:
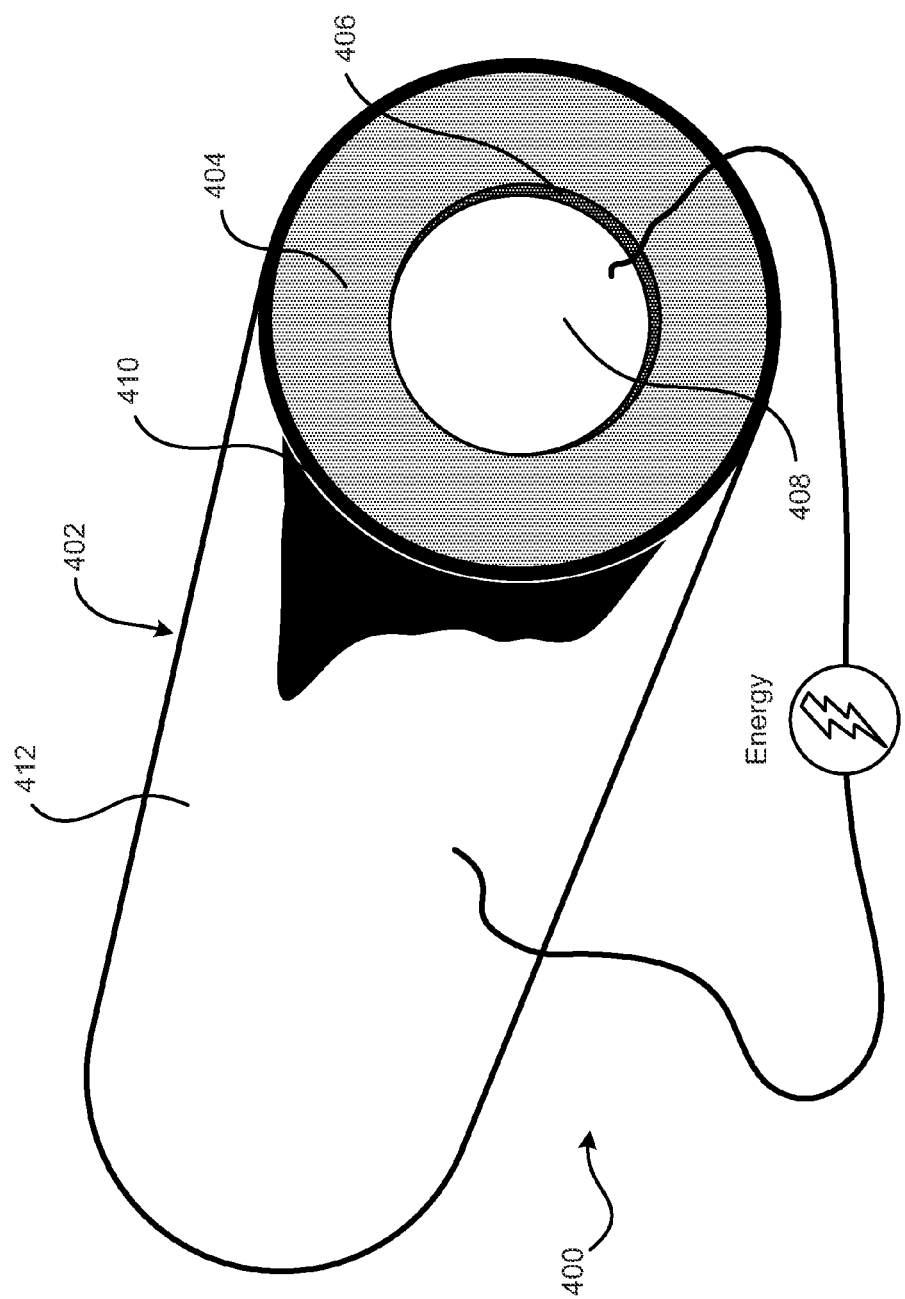
FIG. 4 shows a system for generating energy according to one embodiment.

Now referring to FIG. 4, a system is described that may be used to create electrical energy from a fuel according to one embodiment. The system 400 includes an ionically conductive and electrically resistive structure 402 having a carbon-containing electrically-conductive hollow fiber 404 and a first catalyst 406 coupled to the hollow fiber 404. Also, the system 400 includes an anode 408 extending along at least part of a length of the structure 402. In addition, the system 400 includes a cathode 412 extending along at least part of the length of the structure 402. The cathode 412 is on an opposite side of the hollow fiber 404 as the anode 408.

In FIG. 4, according to one embodiment, the first catalyst 406 is an anode catalyst that is shown near the anode 408 and a second catalyst 410 is a cathode catalyst that is shown near the cathode 412.

As shown in FIG. 4, the anode 408 is present on the interior of the structure 402, while the cathode 412 is present on the exterior of the structure 402. This arrangement may be reversed, such that the anode is present on the exterior of the structure 402 and the cathode is present on the interior of the structure 402. Of course, in such an arrangement, the cathode catalyst 410 and the anode catalyst 406 may be reversed to coincide with the placement of the anode and cathode, respectively.

Note that while various layers and components may be described as "coupled to," "formed on," etc., it is to be understood that such language includes, but is not limited to, formation directly on and coupling directly to the base layer and/or substrate, as well as coupling to intervening layers or structures that are also coupled to the base layer and/or substrate. Thus, for example, the catalyst layers 406 and/or 410 coupled to the hollow fiber 404 may in fact be coupled to polymer layers that overly the hollow fiber 404 and moreover may, in some approaches, partially or fully prevent contact of the catalysts 406 and/or 410 from the hollow fiber 404.

Any catalyst as known by one of skill in the relevant art may be used for the catalysts 406 and/or 410. Examples include platinum (Pt), nickel (Ni), platinum ruthenium (PtRu), etc.

In some embodiments, the hollow fiber 404 may be carbonized, e.g., by pyrolysis at about 600° C. to about 1100° C. for a time sufficient to cause the hollow fiber 404 to be at least about 95% carbon. Carbonized hollow fiber membranes (cHFM) may be used as the basic structural unit of a fuel cell. Each single hollow fiber system may act as a unitary fuel cell. Carbonized hollow fibers are light weight, durable, chemically and thermally stable, and are easily manufactured. The graphene-like chemical structure permits the carbonized hollow fibers to undergo specific chemical reactions to enable selective modification of the surface and bulk properties. The combination of precursor fiber morphology, carbonization methodology, and post-carbonization chemical derivatizations allows carbonized hollow fibers to be configured as fuel cell units with unique properties not found in other systems. A preferred feature of the carbonized hollow fiber is the nanostructure of inner and outer walls of the hollow fiber. Of course, in some other embodiments, the hollow fiber 404 may not be carbonized.

In some approaches, the structure 402 may have a cross-section characteristic of co-extrusion of multiple layers, the hollow fiber 404 may be porous or nonporous, and/or a surface of the hollow fiber 404 may be sulfonated. In some further approaches, the hollow fiber 404 may also be sulfonated interstitially adjacent the surface. Additionally, an opposite surface of the hollow fiber 404 may be fluorinated.

In some more approaches, a surface of the hollow fiber 404 may be fluorinated. Additionally, the hollow fiber 404 may also be fluorinated interstitially adjacent the surface.

In some embodiments, the structure 402 may further comprise a polymer layer along one surface of the hollow fiber 404 for assisting in the ionic conduction. Further, an opposite surface of the hollow fiber 404 relative to the polymer layer may be fluorinated.

The system 400 may further comprise a bus extending along an inner surface of the hollow fiber 404 along an axis of the hollow fiber 404, according to some embodiments.

In more embodiments, the system 400 may further comprise a second catalyst 410 on an opposite side of the hollow fiber 404 as the first catalyst 406. The second catalyst 410 may be the same as the first catalyst 406, or different therefrom. Also, in some embodiments, the first catalyst 406 and/or the second catalyst 410 may be present in particles, may be present as a thin film, etc.

The system 400 may further comprise a solid state fuel positioned towards the anode 408, according to some embodiments. In some instances, the anode 408 may extend along an inner surface of the hollow fiber 404. In some more instances, the anode 408 may extend along an outer surface of the hollow fiber 404.

According to some embodiments, the structure 402 may be cationically conductive. In some other embodiments, the structure 402 may be anionically conductive.

In one particularly preferred embodiment, the system 400 may be part of a woven fabric comprising more than one of said systems. For example, 10-10,000 systems 400 (or more or less) may be woven together to form a larger system, capable of outputting more energy than a single system 400 alone and capable of producing energy more efficiently than by using the 10-10,000 systems 400 (or more or less) separately.

The inner and outer walls of the hollow fiber 404 may be made thin, according to sonic embodiments, and may vary from porous, with about micron diameter pores, to completely nonporous. In some embodiments, the fiber wall adjacent to the cathode 412 interface may have pore diameters less than about 20 nm to enable proton permeability. Such dimensions may allow chemical modifications that enable efficient proton conduction to the cathode 412. Similar porosity on the wall adjacent to the anode 408 is not required and pore size can vary to permit functionalization of the interstitial zone and deposition of the anode catalyst.

Figure 5:
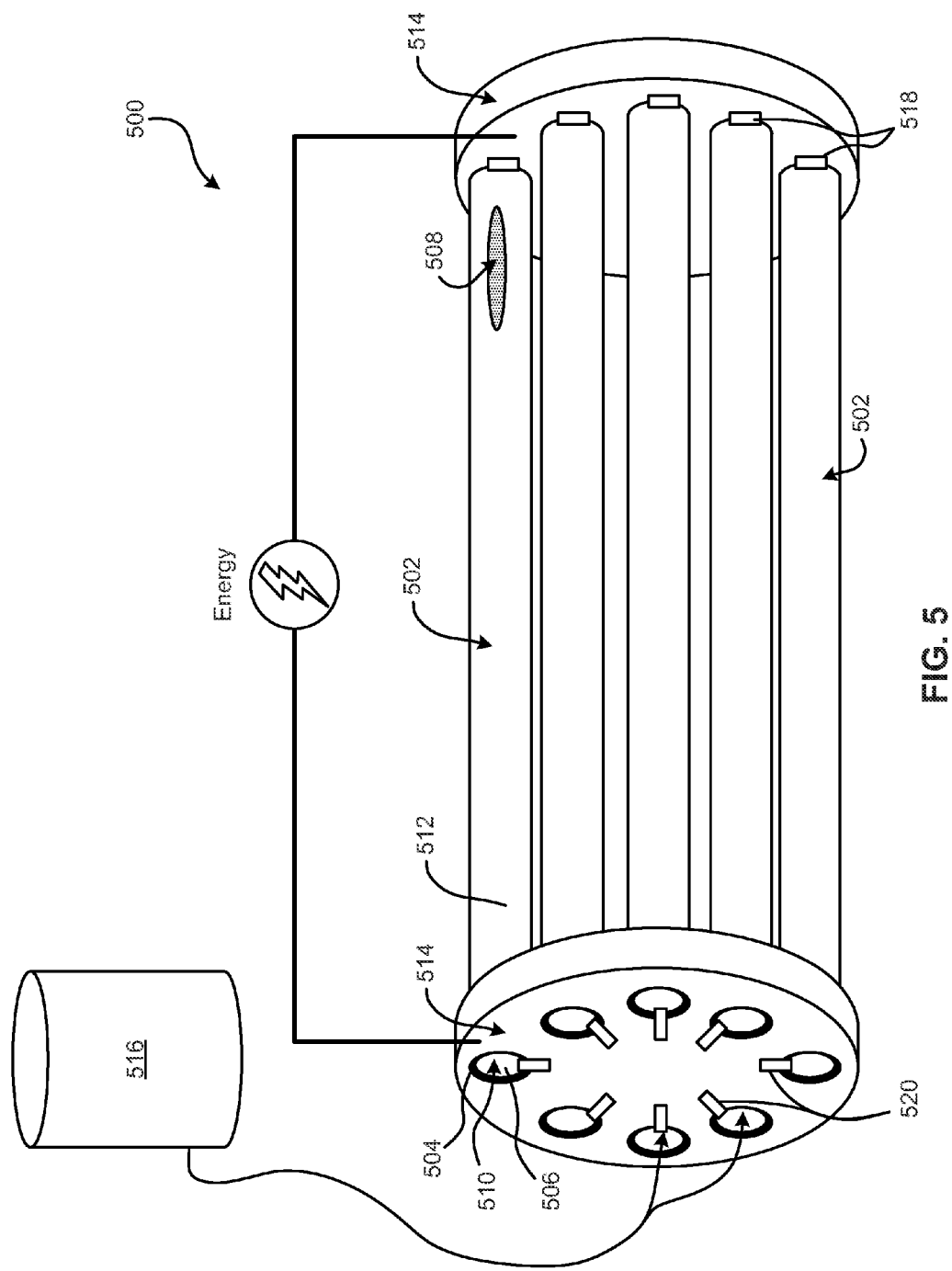
FIG. 5 shows a system for generating energy according to another embodiment.

A stylized rendering of a chemically modified carbonized hollow fiber is shown in FIG. 5, arranged as a modular fuel cell "stack." A use of the carbonized hollow fiber fuel cells may include having the cHFM in a bundle, wherein the bundle may act similarly to a stack of fuel cells (that may be employed in a flat membrane system). The system 500 includes an ionically conductive and electrically resistive structure 502 having a carbonized hollow fiber 504, a first catalyst 506 coupled to the hollow fiber 504, and a second catalyst 508 coupled to the hollow fiber 504 on an opposite side of the hollow fiber 504 as the first catalyst 506. The second catalyst 508 is shown in a cutout of the cathode 512 for greater understanding of the structure 502. A first surface of the hollow fiber 504 is sulfonated, and a second surface of the hollow fiber 504 is fluorinated. The system 500 also includes an anode 510 extending along at least part of a length of the structure 502, a cathode 512 extending along at least part of the length of the structure 502, wherein the cathode 512 is on an opposite side of the hollow fiber 504 as the anode 510. The structure 502 also includes a support structure 514 coupled to each end of the structure 502.

In some approaches, the cathode 512 and the anode 510 may be reversed, such that the anode 510 is present on the exterior of the structure 502 while the cathode 512 is present on the interior of the structure 502.

According to some approaches, the system 500 may comprise a fuel tank 516 in fluid communication with the anode 510. The fuel tank 516 may supply fuel to the system 500 for the generation of energy. In the approach shown, the fuel is passed through the centers of the structures 502 while a source of oxygen, e.g., air, surrounds the exterior of the structures 502. In other approaches, the fuel may be passed over the exterior of the structures 502, while a source of oxygen is present on the interior of the structures 502.

In some more embodiments, the support structure 514 may include a cathode support structure 518 that may be in electrical connection with the cathode 512 of the structure 502. Also, the support structure 514 may include an anode support structure 520 that may be in electrical connection with the anode 510 of the structure 502. The cathode support structure 518 and/or the anode support structure 520 may be a portion of the support structure 514, or may be rigid or semi-rigid structures capable of supporting at least one end of each structure 502.

In some embodiments, the system 500 may be part of a woven fabric comprising multiple of said systems 500.

A property of Nafion-like membranes used in fuel cells is that it is a non-conductive proton-transporting material, useful in fuel cells. This property is probably associated with the relatively nonpolar —$CF_2$=$CF_2$— polymer backbone and the pendant side chains with terminal sulfonate groups. Nanometer-size channels lined with sulfonic acid groups may allow protons Co migrate through Nafion, according to some embodiments. This property can be incorporated into the cHFMs by direct chemical modification of the graphitic carbonized fiber or by application of polymer films, according to some approaches.

Direct chemical modification is advantageous because it is simple and known methods may be used. For example, the inner wall and interstitial can be sulfonated using various sulfonating reagents, including sulfuric acid, fuming sulfuric acid, chlorosulfonic acid and/or sulfur trioxide. These reactions can be performed at room temperature or above. Other methods of introducing sulfonic acid groups have also been demonstrated and could also be extremely useful, according to some embodiments. These include alkylsullonation with 1,3-propanesultone, and arylsulfonations with aryldiazonium salts and/or arylazides. Additionally, other chemical modifications of the carbonized surface could be achieved through phosphorylation, Diels-Alder cycloadditions, nitration, and chemical oxidation that would place polar, proton conducting groups on the surface of channels within the cHFM structure in some approaches.

Fluorination is also a method for modifying the graphene-like material and may be employed to achieve covalent fluorination with formation of C—F bonds, and/or the fluorination reaction can be conducted at more moderate temperatures (about 410° C.) where the molecular fluorine intercalates into the graphene structure and exhibits high ionic character as a fluoride ion ($F^-$) in some approaches. This method of fluorination has been used in the production of graphite-based electrodes.

Other more traditional approaches may also be used to provide cHFMs with the modifications that convert them into fuel cell units. These methods, in some approaches, involve coating the fiber (internally or externally) with a solution-based polymer that leaves a thin film of the desired polymer on the fiber surface. Permutations of these approaches employ solution-based radical initiators that are left to coat the fiber interior. Subsequent treatment with a polymer monomer may result in a robust thin film coating in some approaches. This method has been used to modify electrodes with poly(styrenesulfonic acid).

Solution-phase approaches can also be used to deposit the catalyst materials for the anode and cathode in some embodiments. Solutions containing nanoparticles catalyst may deposit anode material on the inner wall and the interstitial zone surface area. These solutions could contain dilute polymer material to act as an adhesive, which may effectively bind the catalyst to the fiber surface. Other approaches to deposit catalyst include plasma deposition, electrochemical reductive precipitation, and/or chemically reductive catalyst formation, according to different approaches. These approaches are also available for the cathodic surface, e.g., the same approaches that were described for anodic surface deposition may be used for cathodic surface deposition. Electrical leads to the electrode surfaces may be configured using standard electrical contact devices including wires and/or other devices such as pads, contacts, etc.

Figure 3A:
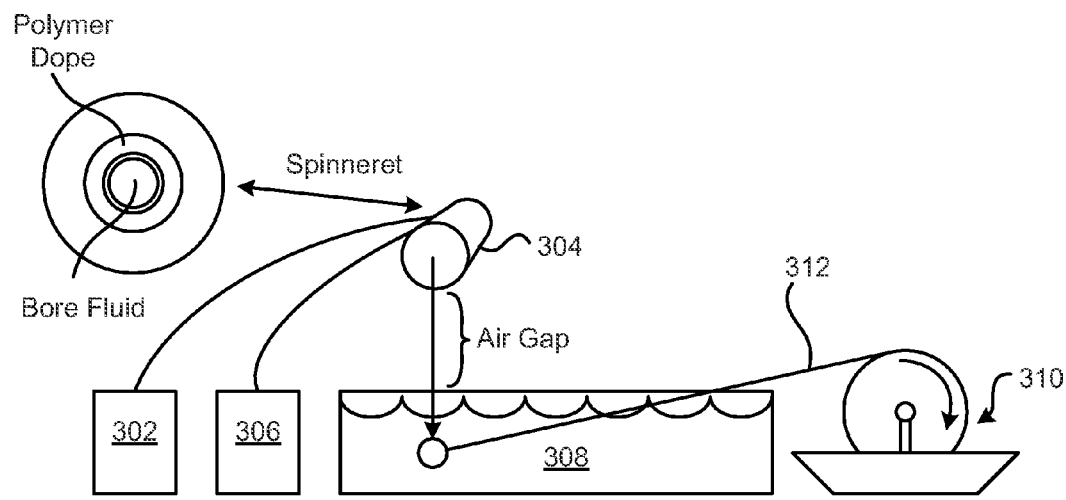
FIG. 3A shows a system for fiber spinning according to one embodiment.
Figure 3B:
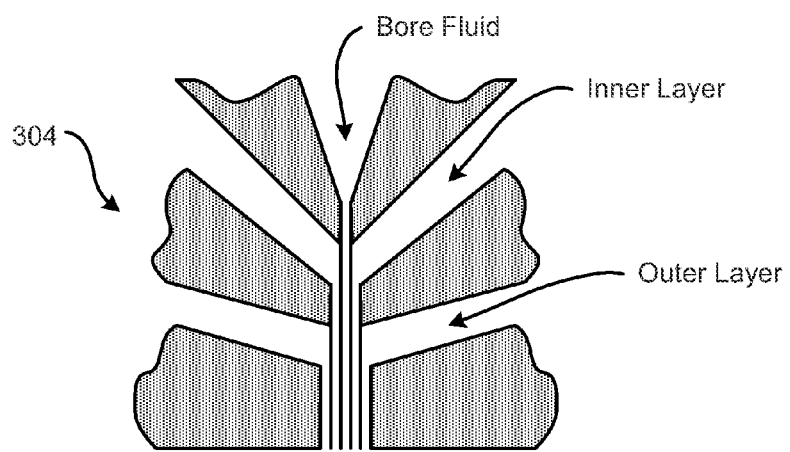
FIG. 3B shows the cross section of a spinneret with three fluid ports according to one embodiment.

According to some embodiments, hollow fibers may be prepared using a fiber extrusion unit like that shown in FIGS. 3A and 3B. The dope solution 302 possibly contains a polymer, a solvent, and often a high-vapor pressure co-solvent. The dope solution 302 is forced through a spinneret 304 such that the polymer is extruded coaxial to an immiscible bore fluid 306, usually a water-based mixture containing an organic co-solvent such as N-methylpyrolidone. As the material exits the spinneret 304, any co-solvent in the dope solution 302 boils off, leaving pores in the outer surface of the wall of the fiber 312. The composition of the bore solution 302 dictates the surface qualities of the inner wall skin of the fiber 312. The fiber 312 is drawn into a quench bath 308 containing solvents that diffuse into the nascent interstitial zone causing the polymer to undergo phase separation and formation of the structured wall. The fiber 312 exits the quench bath 308 and is collected on the take-up drum 310.

In one particularly preferred embodiment, a method for forming a component of a fuel cell system may be carried out in any desired environment. The method may include steps and/or processes shown and/or described in relation to FIG. 3A.

The method includes creating an ionically-conductive, electrically-resistive electrolyte/separator layer covering an inner or outer surface of a carbon-containing electrically-conductive hollow fiber and a catalyst along one side of the hollow fiber. The hollow fiber, in some embodiments, may be formed by extrusion, as described in relation to FIG. 3A. Additionally, the structure may have a cross-section characteristic of co-extrusion of multiple layers.

Many embodiments of the method are possible, and although not all embodiments may be described herein, some preferred embodiments are described below. Also, additional layers and/or materials may be included in the structure which are not described, such as a material between the hollow fiber and the catalyst.

For example, in some embodiments, the method may further include adding an anode that extends along at least part of a length of the structure. Also, a cathode may be added that extends along at least part of the length of the structure. The cathode may be on an opposite side of the hollow fiber as the anode. In some embodiments, the anode and/or the cathode may extend along the entire length of the structure.

In some approaches, the hollow fiber may be carbonized, possibly through one of the carbonization techniques described herein. However, the carbonization is not so limited, and any carbonization technique may be used to carbonize the hollow fiber. Also, in other embodiments, the hollow fiber may not be carbonized.

In more approaches, one surface of the hollow fiber may be sulfonated, possibly through one of the techniques described herein. However, the sulfonation is not so limited, and any sulfonation technique may be used to sulfonate the hollow fiber.

In addition, in some approaches, the sulfonating may include application of a sulfonating reagent (e.g., sulfuric acid, fuming sulfuric acid, chlorosulfonic acid and/or sulfur trioxide), alkylsulfonation (e.g., with 1,3-propanesultone), and/or arylsulfonation (e.g., with aryldiazonium salts and/or arylazides). Of course other known methods can be used as well.

Other embodiments of the method include fluorinating one surface of the hollow fiber and/or modifying one surface of the hollow fiber for assisting in the ionic conduction. Examples of modifying the surface include phosphorylation, Diels-Alder cycloaddition, nitration, and chemical oxidation. At least one of these modifying techniques may possibly be used to modify one surface of the hollow fiber, in some embodiments.

Of course, the method may include other layers and/or formations in addition to the layers previously described. For example, in some approaches, a polymer layer may be formed along one surface of the hollow fiber for assisting in the ionic conduction.

The catalyst may be added to the structure by coupling particles of the catalyst to the hollow fiber. In more embodiments, the catalyst may be formed by plasma deposition, electrochemical reductive precipitation, and/or chemically reductive catalyst formation. Any one of these techniques may be used, or more than one technique may be used. In some embodiments, the structure may further comprise a second catalyst on an opposite side of the hollow fiber as the catalyst. In these embodiments, the second catalyst may be the same or different than the catalyst. Also, the second catalyst may promote a different reaction than the catalyst, and/or it may promote a faster or slower reaction than the catalyst. The second catalyst may also produce a different by-product than the catalyst, and/or may recover a product and/or reactant from a by-product of the reaction promoted by the catalyst. Of course, many other arrangements are possible with the two catalysts, and the examples given above are not meant to limit the use of the second catalyst in any fashion.

In some embodiments, the structure may be woven into a fabric of some type (e.g., to give the structure more rigidity and/or support without greatly increasing the weight), the hollow fiber may be porous or nonporous, etc.

In a particularly preferred embodiment, a method may include acquiring an ionically-conductive, electrically-resistive electrolyte/separator layer covering the inner or outer surface of the carbon-containing electrically-conductive hollow fiber and a catalyst along one side thereof. For example, the structure may resemble that shown in FIG. 4. The method may also include adding an anode that extends along at least part of a length of the structure and adding a cathode that extends along at least part of the length of the structure. The cathode is on an opposite side of the hollow fiber as the anode. In some embodiments, the anode and/or the cathode may extend along the entire length of the structure.

In one approach, this method may further comprise forming the structure. Any technique may be used to form the structure, such as those described herein. Of course, any method may be used to form the structure. In some approaches, the forming f the structure may include carbonizing the hollow fiber.

In more approaches, the structure may include any of the layers, methods, formations, etc. that are described above in relation to the first described method.

According to some embodiments, application of tension while drawing the fiber can promote formation of additional beneficial features. The properties of hollow fiber membranes come from their unique structures. The fiber diameters are typically less than 1 mm diameter and the fibers possess wall thicknesses of a few hundred microns. The diameter of the internal fiber bore is also around a few hundred microns. The features most responsible for the fiber properties are the extremely thin (about 10-about 500 nanometers thick) inner and outer skins on the surface of the fiber wall. These thin layers may be supported by the porous interstitial microstructure giving the entire fiber a robust structure capable of being bent and handled almost as if it were string. The inner and outer skins can be made porous or pinhole-free, and the interstitial zone can be formed to posses relative symmetry across the wall thickness or be asymmetric with the void volume changing along the cross sectional profile.

Hollow fibers can be spun with many different polymers, according to some embodiment, to provide membranes with a variety of different properties. Carbonization of hollow fibers has been shown to provide very robust fibers that are chemically and thermally stable and that contain the structural features found in the initial material. The carbonization process may involve heating the fiber under controlled conditions to temperatures often in excess of about 900° C. or more to convert the polymer of the hollow fiber into a high carbon content material (greater than about 95% carbon). Treatment of these fibers to higher temperatures converts the material to graphene-like material with properties very similar to graphite. The structural and chemical features of carbonized hollow fibers may provide for a new configuration of fuel cell membranes with better properties than existing technologies. The use of hollow fiber membranes as the separation medium allows a fundamentally different fuel cell membrane configuration according to preferred embodiments, and may result in a cell that delivers more power per unit of weight than conventional fuel cells. A majority of the weight and volume of conventional fuel cells is in the frame structures that support the flat membrane materials. Hollow fiber membranes can be configured in bundles with support structures only at the ends of the bundle, e.g., at the anode and at the cathode. Thus, hollow fiber membrane fuel cells may provide for an improved power-to-weight ratio, allowing the development of lighter and smaller fuel cells for devices with energy requirements that cannot be met with present technology. Hollow fiber membrane fuel cells may also be easier to manufacture, easier to operate at more optimal lower temperatures, may use a greater variety of fuels, and may require lower cost catalysts than conventional fuel cells.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    acquiring a structure, having an ionically-conductive, electrically-resistive electrolyte/separator layer covering an inner or outer surface of a carbon-containing electrically-conductive hollow fiber and a catalyst along one side thereof;
    adding an anode that extends along at least part of a length of the structure; and
    adding a cathode that extends along at least part of the length of the structure, the cathode being on an opposite side of the hollow fiber as the anode.

2. The method of claim 1, further comprising forming the structure, the forming including carbonizing the hollow fiber.

3. The method of claim 1, wherein the structure further comprises a second catalyst on an opposite side of the hollow fiber as the catalyst.

4. The method of claim 1, wherein the hollow fiber is not carbonized.

5. The method of claim 1, wherein the hollow fiber is porous.

6. The method of claim 1, wherein the hollow fiber is nonporous.

7. The method of claim 1, further comprising weaving the structure into a fabric.

8. A method for forming a component of a fuel cell system, the method comprising:
    creating a structure having an ionically-conductive, electrically-resistive electrolyte/separator layer covering an inner or outer surface of a carbon-containing electrically-conductive hollow fiber and a catalyst along one side of the hollow fiber.

9. The method of claim 8, further comprising adding an anode that extends along at least part of a length of the structure and adding a cathode that extends along at least part of the length of the structure, the cathode being on an opposite side of the hollow fiber as the anode.

10. The method of claim 8, further comprising carbonizing the hollow fiber.

11. The method of claim 8, further comprising sulfonating one surface of the hollow fiber.

12. The method of claim 8, wherein the sulfonating includes at least one of: application of a sulfonating reagent; alkylsulfonation; and arylsulfonation.

13. The method of claim 8, further comprising fluorinating one surface of the hollow fiber.

14. The method of claim 8, further comprising modifying one surface of the hollow fiber for assisting in the ionic conduction, the modifying being selected from a group consisting of phosphorylation, Diels-Alder cycloaddition, nitration, and chemical oxidation.

15. The method of claim 8, further comprising forming a polymer layer along one surface of the hollow fiber for assisting in the ionic conduction.

16. The method of claim 8, further comprising forming the hollow fiber by extrusion.

17. The method of claim 16, wherein the structure has a cross-section characteristic of co-extrusion of multiple layers.

18. The method of claim 8, wherein the catalyst is added to the structure by coupling particles of the catalyst to the hollow fiber.

19. The method of claim 8, wherein the catalyst is formed by at least one of plasma deposition, electrochemical reductive precipitation, and chemically reductive catalyst formation.

20. The method of claim 8, wherein the structure further comprises a second catalyst on an opposite side of the hollow fiber as the catalyst.

* * * * *